(12) United States Patent
Santori et al.

(10) Patent No.: US 7,546,013 B1
(45) Date of Patent: Jun. 9, 2009

(54) NANOPARTICLE COUPLED TO WAVEGUIDE

(75) Inventors: Charles Santori, Palo Alto, CA (US);
Sean Spillane, Palo Alto, CA (US);
Raymond G. Beausoleil, Palo Alto, CA (US);
Marco Fiorentino, Palo Alto, CA (US)

(73) Assignee: Hewlett-Packard Development Company, Houston, TX (US)

( * ) Notice: Subject to any disclaimer, the term of this patent is extended or adjusted under 35 U.S.C. 154(b) by 247 days.

(21) Appl. No.: 11/444,222

(22) Filed: May 31, 2006

(51) Int. Cl.
*G02B 6/26* (2006.01)

(52) U.S. Cl. .......................................... 385/39; 385/31

(58) Field of Classification Search ................. None
See application file for complete search history.

(56) References Cited

U.S. PATENT DOCUMENTS

| | | | | |
|---|---|---|---|---|
| 5,422,907 | A * | 6/1995 | Bhargava | 372/68 |
| 6,697,548 | B2 * | 2/2004 | LoCascio et al. | 385/16 |
| 7,019,333 | B1 * | 3/2006 | Shields et al. | 257/97 |
| 2002/0186921 | A1 * | 12/2002 | Schumacher et al. | 385/31 |
| 2002/0196827 | A1 * | 12/2002 | Shields et al. | 372/45 |
| 2003/0044114 | A1 * | 3/2003 | Pelka | 385/31 |
| 2003/0063748 | A1 * | 4/2003 | Shields | 380/256 |
| 2004/0109483 | A1 | 6/2004 | Simpson et al. | |
| 2006/0165895 | A1 * | 7/2006 | Cartagena | 427/258 |
| 2007/0277730 | A1 * | 12/2007 | Rabeau et al. | 117/84 |

FOREIGN PATENT DOCUMENTS

| | | |
|---|---|---|
| EP | 1503328 | 2/2005 |
| FR | 2809542 | 11/2001 |
| WO | WO 2005/085946 | 9/2005 |
| WO | WO2006/135789 | 12/2006 |

OTHER PUBLICATIONS

B. J. Eggleton et al. Grating resonances in air-silica microstructured optical fibers. Optics Letters, 24:21:1460-1462, Nov. 1999.*
Gotzinger et al., "Towards controlled coupling between a high-Q whispering-gallery mode and a single nanoparticle," Appl. Phys. B 73, 825-828 (2001).
Rabeau et al., "Diamond chemical-vapor deposition on optical fibers for fluorescence waveguiding," Appl. Phys. Lett. 86, 134104 (2005).
Birks T A et al—"Very High Numerical Aperture Fibers"—IEEE Photonics Technology Letters—vol. 16 No. 3—Mar. 2004—pp. 843-845.

* cited by examiner

*Primary Examiner*—Sung H Pak
*Assistant Examiner*—Mike Stahl

(57) ABSTRACT

A nanoparticle is able to emit single photons. A waveguide is coupled to the nanoparticle and able to receive the single photons. A backreflector is optically coupled to the waveguide and configured to reflect the single photons toward the waveguide.

18 Claims, 5 Drawing Sheets

NANOPARTICLE COUPLED TO WAVEGUIDE

BACKGROUND

Nanotechnology and quantum information technology are emerging branches of science that involve the design of extremely small electronic and optical circuits that are built at the molecular level. Traditional opto-electronic circuits are fabricated using semiconductor wafers to form chips. Circuits are etched into the semiconductor wafers or chips. The etching process removes material from certain regions or layers of the chips. In contrast, nanotechnology generally deals with devices built upward by adding material, often a single atom at a time. This technique results in a device where every particle could have a purpose. Thus, extremely small devices, much smaller than devices formed by etching, are possible. For example, a logic gate could be constructed from only a few atoms. An electrical conductor can be built from a "nanowire" that is a single atom thick. A bit of data could be represented by the presence or absence of a single proton.

Quantum information technology provides a new avenue for creating smaller and potentially more powerful computers. Scientific theories such as quantum superposition and quantum entanglement are now being used to explore the possibility of creating smaller, more powerful computing devices. The development in this field has led to the use of light particles, or photons, to convey information. Light can be polarized into various states (e.g., horizontally polarized, vertically polarized) and can also exist in various momentum and frequency states. Exploiting these properties allows a single photon to represent a single quantum bit of information.

BRIEF DESCRIPTION OF THE DRAWINGS

For the purpose of illustrating the invention, there is shown in the drawings one exemplary implementation; however, it is understood that this invention is not limited to the precise arrangements and instrumentalities shown.

DETAILED DESCRIPTION

The use of quantum bits provides researchers with significant potential advancements in computing technology. The ability to understand and utilize the theories of photon superposition and entanglement to generate information is a new field around which there is significant interest. However, one important issue that surrounds potential use of photons as quantum bits is the need to generate a photon on demand at the location where it is desired. A second important issue is the ability to detect and capture the photons; that is, to efficiently collect light emitted from the photon source. Both of the foregoing attributes are useful in creating single-photon sources and nonlinear devices. Some exemplary devices and techniques for addressing these needs are described in copending and commonly assigned U.S. patent application Ser. No. 11/149,511, entitled "Fiber-Coupled Single Photon Source", filed Jun. 10, 2005, the disclosure of which hereby is incorporated by reference herein.

Figure 1:
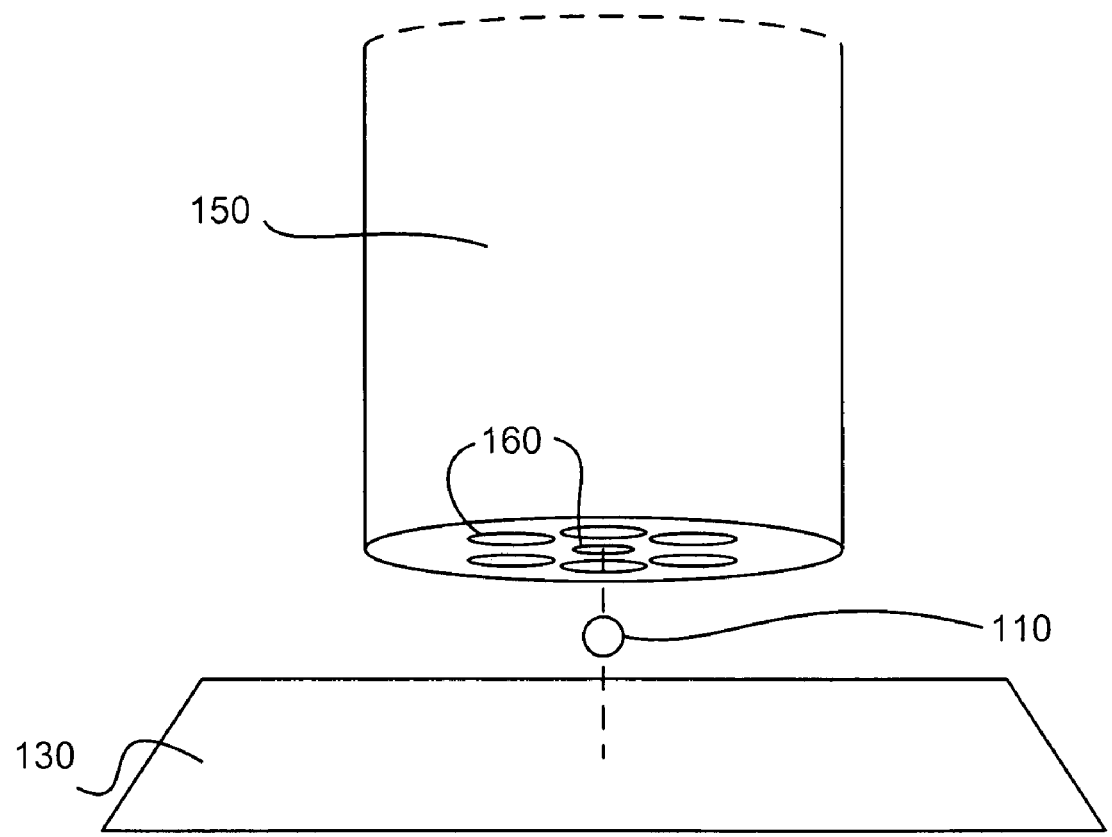
FIG. 1 illustrates an exploded view of a device comprising an exemplary nanoparticle coupled to a waveguide and a backreflector in accordance with an embodiment of the invention.

FIG. 1 illustrates an exploded view of a device according to an embodiment of the invention, comprising an exemplary nanoparticle 110 coupled to a waveguide 150 and a backreflector 130. Nanoparticle 110 is able to emit a photon on demand, and thus can serve as a photon source.

An exemplary nanoparticle 110 is a particle with dimensions smaller than the wavelength of light, that can be made to emit photons at a desired wavelength at which a device using an embodiment of the invention will operate. Typically, nanoparticle 110 is approximately 10-100 nm in diameter. Generally, for a nanoparticle 110 to be useful in a device according to an embodiment of the invention, the nanoparticle 110 must provide a single quantum system that can be addressed optically; or if there are multiple quantum systems, it must be possible to address them individually through frequency selection.

In some embodiments, the nanoparticle 110 is grown in a semiconductor substrate. Group IV, Group III-V, or Group II-VI semiconductor materials may be used. A typical material may comprise Si or GaAs.

An exemplary nanoparticle 110 can be joined to either the backreflector 130 or to the waveguide 150, or to both. For example, the nanoparticle 110 can be placed or grown on the backreflector 130, or can be placed or grown on the end of waveguide 150. Illustrative examples of a suitable nanoparticle 110 include nanocrystals such as a diamond nanocrystal with nitrogen vacancy (NV) center, and a semiconductor nanocrystal. In a further embodiment, nanoparticle 110 can comprise an electrically driven or optically driven quantum dot. Quantum dots are capable of generating a single photon when excited by an electrical charge or an optical laser. Further examples of nanoparticle 110 include a self-assembled quantum dot placed or grown on the backreflector 130 or in a micropillar on the backreflector 130.

In the illustrated embodiment, the waveguide 150 is photonic crystal fiber, which is capable of suppressing leaky modes. Photonic crystal fiber, referred to as "holey" fiber, comprises a plurality of airhole passages 160 residing within the fiber. Examples of suitable photonic crystal fiber may be either solid or hollow core. In other embodiments, the waveguide 150 can be a suitable hollow-core bandgap fiber capable of suppressing leaky modes, e.g., omniguide fiber.

In one exemplary embodiment, nanoparticle 110 can be positioned on an end of waveguide 150, such as by growing or placing the nanoparticle 110 on the end of waveguide 150, and the backreflector 130 (e.g., a distributed Bragg reflector) can be grown over the nanoparticle 110 and the end of waveguide 150, thus forming a layer to seal the nanoparticle 110 to the end of waveguide 150. In embodiments of the invention, the nanoparticle 110 may be, but need not be, perfectly centered on the end of waveguide 150. In some embodiments, nanoparticle 110 may be coupled to an airhole passage 160, such as at an inner edge of the central airhole passage 160. In some embodiments, nanoparticle 110 is fully outside of airhole passage 160; in other embodiments, nanoparticle 110 may enter airhole passage 160.

Backreflector 130 is configured to reflect photons toward the waveguide 150. An exemplary backreflector 130 comprises a Bragg reflector (e.g., a distributed Bragg reflector). Bragg reflectors are known within the art and are used in applications that require high reflectivity. In some embodiments, backreflector 130 is a frequency-selective mirror. In further embodiments, backreflector 130 comprises a metallic reflector, e.g., a metallic film.

To maintain alignment, the waveguide 150, nanoparticle 110, and backreflector 130 may in some embodiments be secured in place; for example, using known techniques, such as using an adhesive. The backreflector 130, in some embodiments, can be mechanically coupled to the end of waveguide 150, e.g., using glue or epoxy having a suitably low refractive index.

Figure 4:
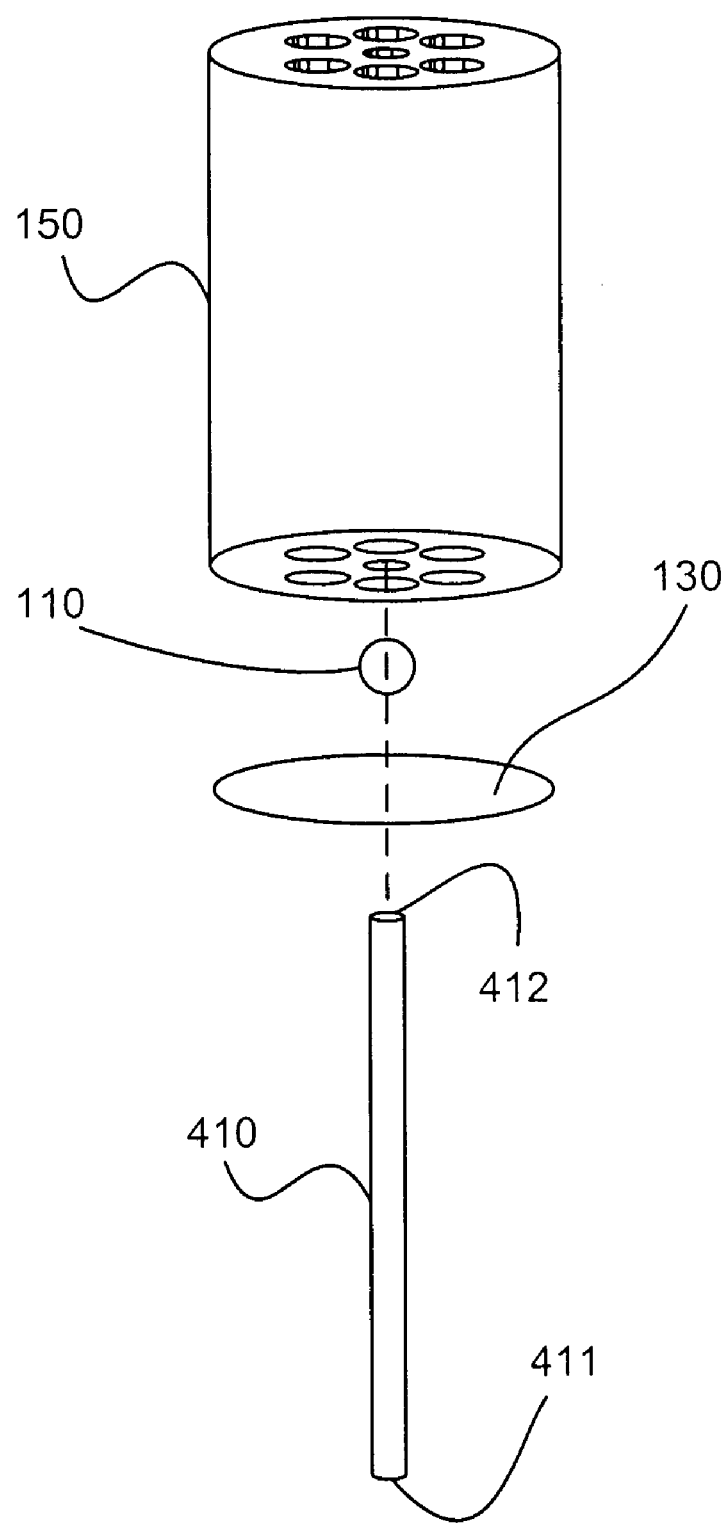
FIG. 4 is a schematic drawing of an exploded view of a device comprising an exemplary nanoparticle, waveguide and backreflector coupled to a single-mode optical fiber in accordance with an exemplary embodiment of the invention.
Figure 5:
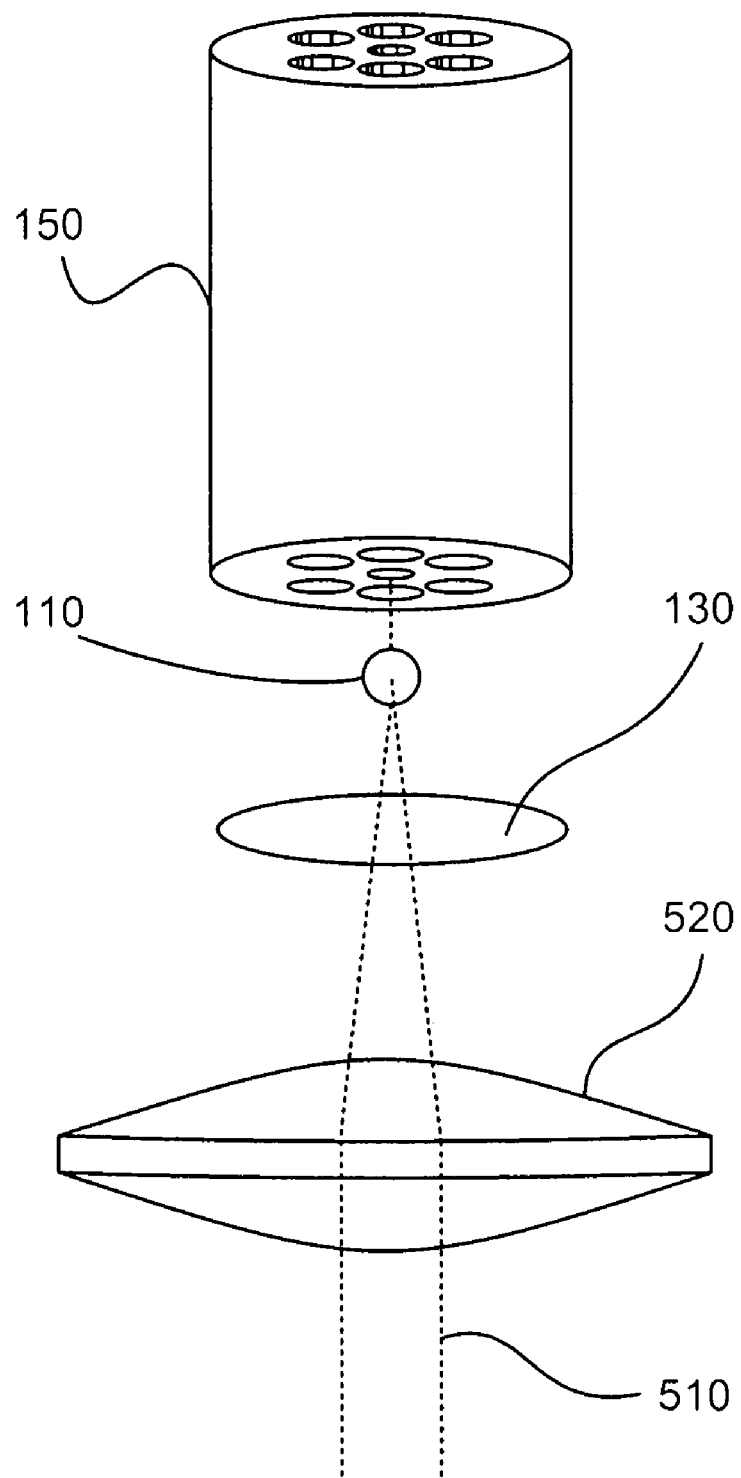
FIG. 5 is a schematic drawing of an exploded view of a device comprising an exemplary nanoparticle, waveguide and backreflector coupled to a lens in accordance with an exemplary embodiment of the invention.

The nanoparticle 110 can be triggered to emit a photon; for example, through pulsed optical excitation, in which the nanoparticle 110 is optically pumped using a pulse with an excitation wavelength that is shorter than the emission wavelength of the nanoparticle 110. In some exemplary embodiments, the excitation pulse can enter through the backreflector 130 if the backreflector 130 is partially transparent at the excitation wavelength; for example, as illustrated in FIGS. 4 and 5.

In further embodiments, the excitation pulse can enter through the side of the waveguide 150, or directly through the guided mode of the waveguide 150 (e.g., from a second end of the waveguide 150 that is distal to nanoparticle 110). In some embodiments, if the excitation wavelength is different from the spontaneous emission wavelength of the nanoparticle 110, spectral filtering can be applied later to separate the resulting emitted photon from the backreflected or scattered excitation pulse. In further embodiments, excitation pulses can be timed or gated to distinguish the resulting emitted photon from the backreflected or scattered excitation pulse.

Alternatively, a device according to an embodiment of the invention can serve as a nonlinear device if one or more input pulses with appropriate temporal profiles are resonant with optical transitions of the nanoparticle 110. The pulses then interact with each other through the nonlinearity provided by the nanoparticle 110, allowing for switching or entanglement in the reflected pulses.

Figure 2:
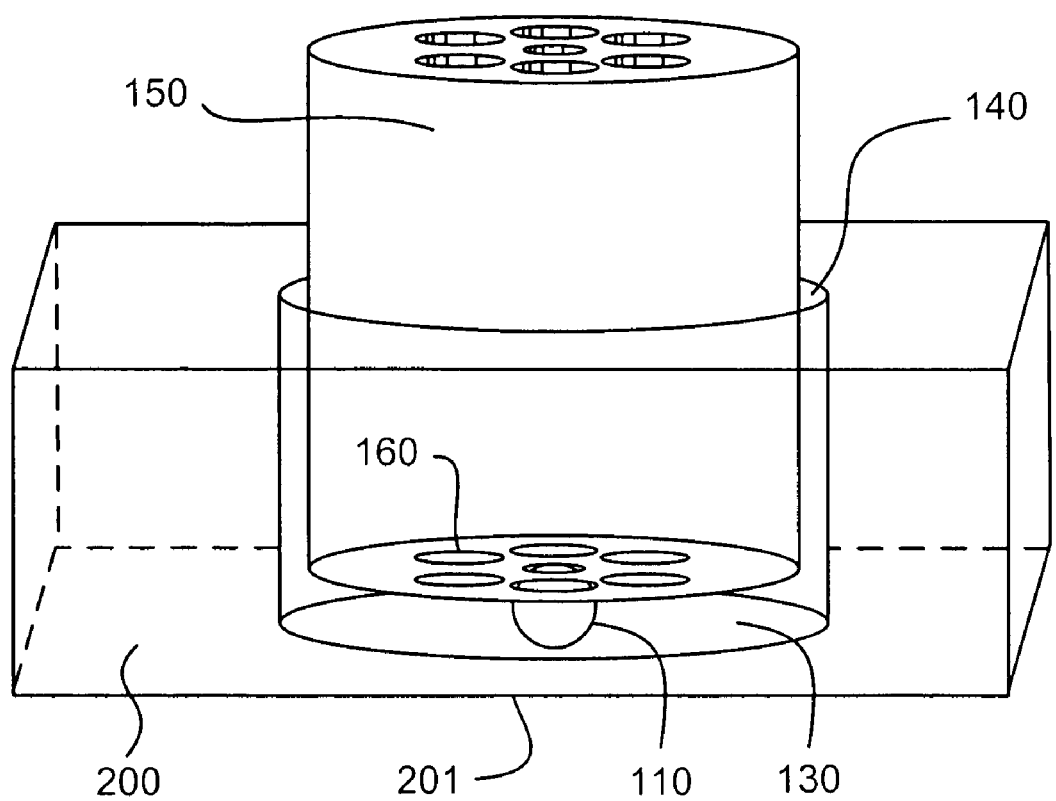
FIG. 2 is a schematic drawing of an exemplary nanoparticle coupled to a waveguide and a backreflector in accordance with a further embodiment of the invention.

Referring to FIG. 2, an alternative embodiment for enabling coupling of a nanoparticle 110 to a waveguide 150 is shown. In some embodiments, the nanoparticle 110 can be grown in a substrate 200. Nanoparticle 110 is positioned such that it aligns with or extends into an airhole passage 160 of the waveguide 150, such as the central airhole passage 160.

The airhole passages 160 extend through the waveguide 150, from a hole at the end of the waveguide 150 coupled to nanoparticle 110 to a corresponding hole at the opposite end of the waveguide 150; however, for clarity of illustration, the intervening portions of airhole passages 160 are not depicted in FIG. 2.

Maintaining the desired mechanical positioning relationship between nanoparticle 110 and waveguide 150 can be difficult. To overcome this difficulty, the waveguide 150 can be precisely positioned on the surface of a substrate 200. In some embodiments, the nanoparticle 110 is grown within a substrate 200 such as silicon. An indexing hole 140, into which the waveguide 150 can be positioned, is etched in the substrate 200 surrounding the nanoparticle 110. By accurately indexing the waveguide 150 to the location of the nanoparticle 110, the mechanical positioning between the nanoparticle 110 and the waveguide 150 can be better maintained and, as a result, the probability of capturing a generated photon is increased. To maintain the alignment, the waveguide 150 may be secured in place; for example, by using known techniques, such as using an adhesive.

The backreflector 130 is placed or grown beneath the indexing hole 140. For example, backreflector 130 can comprise a Bragg reflector at the bottom of the indexing hole 140. In some embodiments, backreflector 130 can be positioned on a lower side 201 of substrate 200, opposite the end of waveguide 150.

In the illustrated embodiment, the waveguide 150 is positioned within the indexing hole 140 such that the nanoparticle 110 extends into a selected airhole passage 160 contained within the waveguide 150. Using this configuration, the nanoparticle 110 can be precisely positioned relative to the waveguide 150. Additionally, the coupling efficiency can be improved by means of mode-matching between the dipole radiation of the nanoparticle 110 and the guided mode of the waveguide 150, coupled with the fact that photonic crystal fiber typically has a larger numerical aperture than conventional single mode fiber, such as is commonly used in the telecommunications industry (e.g., single mode fiber typically has a numerical aperture ranging from approximately 0.2-0.5 while photonic crystal fiber typically has a numerical aperture ranging from approximately 0.7-0.9).

Figure 3:
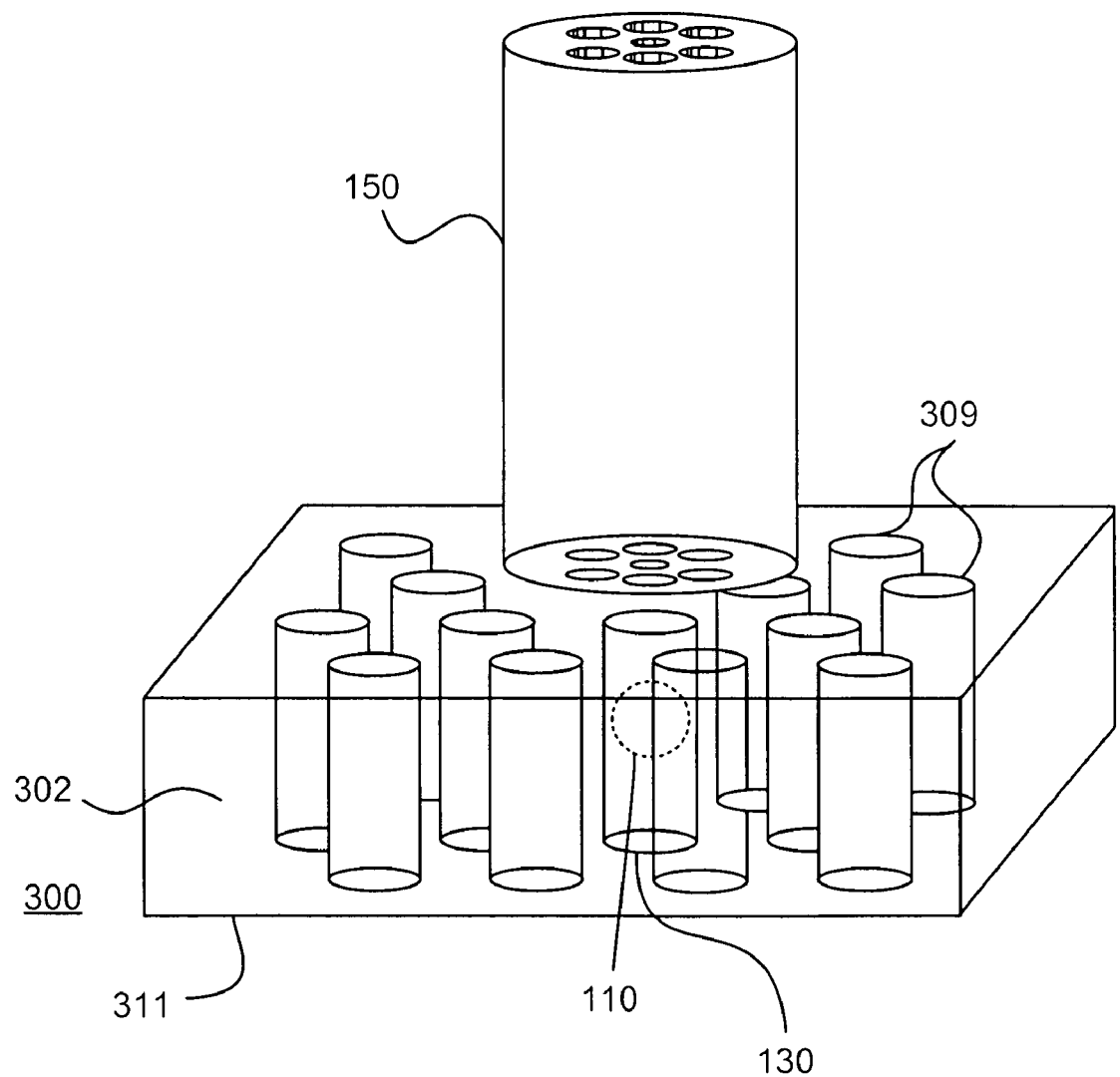
FIG. 3 is a schematic drawing of an exemplary nanoparticle embedded in two-dimensional photonic crystal, coupled to a waveguide and a backreflector in accordance with an embodiment of the invention.

In some instances, the direct coupling process may be improved by using a configuration as shown in FIG. 3. A nanoparticle 110 may be embedded into a substrate 300 that comprises a two dimensional photonic crystal 302. Two dimensional photonic crystals can provide Bragg reflections and large index dispersion in a two dimensional plane. At each interface within the crystal, light is partly reflected and partly transmitted. By using this property of photonic crystals, the photon emitted by the nanoparticle 110 can be better mode matched to the fundamental mode of a waveguide 150. A pattern of holes 309 may be etched into the two dimensional photonic crystal, which may be used for aligning the waveguide 150 in a precise mechanical position relative to the nanoparticle 110.

Backreflector 130 is placed or grown beneath one or more of the holes 309. For example, backreflector 130 can comprise a Bragg reflector at the bottom of a hole 309 that contains nanoparticle 110. In some embodiments, backreflector 130 can be positioned on a lower side 311 of substrate 300, opposite the end of waveguide 150.

By embedding the nanoparticle 110 in the two dimensional photonic crystal 302, radiation by the nanoparticle 110 into modes outside of the waveguide 150 is suppressed. Further, by embedding the nanoparticle 110 into the two dimensional photonic crystal substrate 302, such as glass coated with a InGaAs or Si/SiO$_2$ coating, radiation is prevented from emanating from nanoparticle 110 in most directions. A waveguide 150 can be positioned in close proximity (e.g., less than one micron) to the nanoparticle 110 to capture a generated photon.

FIG. 4 illustrates an exploded view of a device comprising an exemplary nanoparticle 110, waveguide 150 and backreflector 130 coupled to a single-mode optical fiber 410 in accordance with an exemplary embodiment of the invention. To provide optical pumping or optical excitation of the nanoparticle 110 in an embodiment of the invention, a single-mode optical fiber 410 of arbitrary length is coupled to a photon source (not shown) at a source end 411. Photons are transmitted through fiber 410 from the source end 411 to a destination end 412. The fiber 410 can be crafted to approximately mode-match the mode of the waveguide 150. The fiber 410 may in some embodiments be coupled (e.g., joined or spliced) to backreflector 130 and waveguide 150; for example, by using known techniques, such as using an adhesive.

Backreflector 130 is configured to reflect photons into waveguide 150, and is at least partially transparent at an excitation wavelength, so that photons can be transmitted at the excitation wavelength from the destination end 412 of fiber 410 to the nanoparticle 110. In the illustrated embodiment, the nanoparticle 110 can be optically pumped by transmitting a pulse through the fiber 410 to the nanoparticle 110 with an excitation wavelength that is shorter than the emission wavelength of the nanoparticle 110. In some embodiments, the backreflector 130 is a frequency-selective mirror. In other embodiments, backreflector 130 comprises a metallic reflector. In an illustrative example, a metallic backreflector 130 may be less than one percent (1%) transparent at the excitation frequency, but a sufficiently strong pulse can be provided through fiber 410 that the portion of the pulse that passes through the metallic backreflector 130 is sufficient to excite the nanoparticle 110.

FIG. 5 illustrates an exploded view of a device comprising an exemplary nanoparticle 110, waveguide 150 and backreflector 130 optically coupled to a lens 520 in accordance with an exemplary embodiment of the invention. To provide optical pumping or optical excitation of the nanoparticle 110 in an embodiment of the invention, the lens 520 is configured to focus an optical beam 510 on the nanoparticle 110. The lens 520, in some embodiments, can be mounted in an objective (not shown). In further embodiments, the lens 520 can be part of an optical train or system that includes multiple lenses, mirrors, and the like for directing and focusing the beam 510 on the nanoparticle 110.

Backreflector 130 is configured to reflect photons into waveguide 150, and is at least partially transparent at an excitation wavelength, so that photons of the optical beam 510 can be transmitted at the excitation wavelength through the backreflector 130 to the nanoparticle 110. In the illustrated embodiment, the nanoparticle 110 can be optically pumped by transmitting a pulse through the lens 520 to the nanoparticle 110 with an excitation wavelength that is shorter than the emission wavelength of the nanoparticle 110. In some embodiments, the backreflector 130 is a frequency-selective mirror. In other embodiments, backreflector 130 comprises a metallic reflector. In an illustrative example, a metallic backreflector 130 may be less than one percent (1%) transparent at the excitation frequency, but a sufficiently strong pulse can be transmitted through lens 520 that the portion of the pulse that passes through the metallic backreflector 130 is sufficient to excite the nanoparticle 110.

Although several embodiments have been described, features from different embodiments may be combined. For example, either the fiber 410 shown in FIG. 4 or the lens 520 shown in FIG. 5 may be positioned on the side of the backreflector 130 shown in FIGS. 1-3 that is opposite the nanoparticle 110. For example, the lens 520 shown in FIG. 5 may be used to direct optical beam 510 onto the nanoparticle 110 shown in FIGS. 1-3 from a position, such as a side position, where the optical beam 510 does not pass through the backreflector 130 shown in FIGS. 1-3. A variety of modifications to the embodiments described will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A device comprising:
   an individually addressed nanoparticle for emitting single photons;
   a photonic crystal fiber waveguide for receiving the single photons, the waveguide optically coupled to the nanoparticle at an endface of the waveguide not treated to increase reflection, the waveguide endface disposed adjacent to the nanoparticle; and
   a single backreflector optically coupled to the waveguide and configured to reflect at least some of the single photons toward the waveguide, the backreflector disposed adjacent to the nanoparticle and the waveguide endface;
   wherein the nanoparticle is placed on one of the backreflector and the waveguide.

2. The device as set forth in claim 1, wherein the nanoparticle comprises a quantum dot.

3. The device as set forth in claim 1, wherein the nanoparticle comprises a nanocrystal.

4. The device as set forth in claim 1, wherein the backreflector comprises a Bragg reflector.

5. The device as set forth in claim 1, wherein the nanoparticle is placed within a substrate, and the waveguide is aligned with the nanoparticle using an alignment recess etched in the substrate.

6. The device as set forth in claim 1, wherein the nanoparticle is joined to the backreflector.

7. The device as set forth in claim 1, wherein the nanoparticle is joined to the waveguide.

8. The device as set forth in claim 1, wherein the nanoparticle is positioned on the waveguide, and the backreflector is layered over the waveguide and the nanoparticle.

9. The device as set forth in claim 1, wherein the backreflector is at least partially transparent at an excitation frequency for exciting the nanoparticle.

10. The device as set forth in claim 9, further comprising:
    an optical fiber coupled to the backreflector, and able to direct a pulse through the backreflector toward the nanoparticle at the excitation frequency.

11. The device as set forth in claim 9, further comprising:
    a lens optically coupled to the backreflector, and able to direct a pulse through the backreflector toward the nanoparticle at the excitation frequency.

12. A method for suppressing leaky modes in photon transmission, comprising:
    optically coupling an individually addressed nanoparticle to a photonic crystal fiber waveguide endface not treated to increase reflection disposed adjacent to the nanoparticle, and
    optically coupling a single backreflector to the endface of the waveguide behind the nanoparticle and adjacent to the nanoparticle and the waveguide endface;
    wherein the nanoparticle is placed on one of the backreflector and the waveguide.

13. The method of claim 12 wherein coupling a nanoparticle comprises placing the nanoparticle at an airhole passage of the waveguide.

14. The method of claim 12 further comprising:
    exciting the nanoparticle to emit a single photon,
    reflecting the single photon toward the waveguide, and
    guiding the photon through the waveguide.

15. The method of claim 14 wherein exciting the nanoparticle further comprises directing an optical pulse through the waveguide toward the nanoparticle.

16. The method of claim 14 wherein exciting the nanoparticle further comprises directing an optical pulse through the backreflector toward the nanoparticle.

17. A device comprising:
    individually addressed nanoparticle quantum photon emitting means for emitting single photons;

photonic crystal fiber photon guiding means for receiving the single photons, the photon guiding means optically coupled to the emitting means at an endface of the photon guiding means not treated to increase reflection, the photon guiding means endface disposed adjacent to the emitting means; and a single photon reflecting means optically coupled to the photon guiding means and configured to reflect at least some of the single photons toward the endface of the photon guiding means, the photon reflecting means disposed adjacent to the emitting means and the photon guiding means endface;

wherein the emitting means is placed on one of the photon reflecting means and the photon guiding means.

18. A device comprising:

an individually addressed nanoparticle for emitting single photons;

a photonic crystal fiber waveguide coupled to the nanoparticle at an endface of the waveguide not treated to increase reflection and able to receive the single photons; and a backreflector optically coupled to the waveguide and configured to reflect at least some of the single photons toward the waveguide;

wherein the nanoparticle is positioned on the waveguide, and the backreflector is layered over the waveguide and the nanoparticle.

* * * * *